Jan. 26, 1943. C. H. KASCH 2,309,119
AUTOMATIC HYDRAULIC CLUTCH
Filed Feb. 12, 1941 3 Sheets-Sheet 1

INVENTOR
Charles H. Kasch
BY
*J. J. Kessenich & J. H. Church*
ATTORNEYS

Jan. 26, 1943.　　　　C. H. KASCH　　　2,309,119
AUTOMATIC HYDRAULIC CLUTCH
Filed Feb. 12, 1941　　　　3 Sheets-Sheet 2
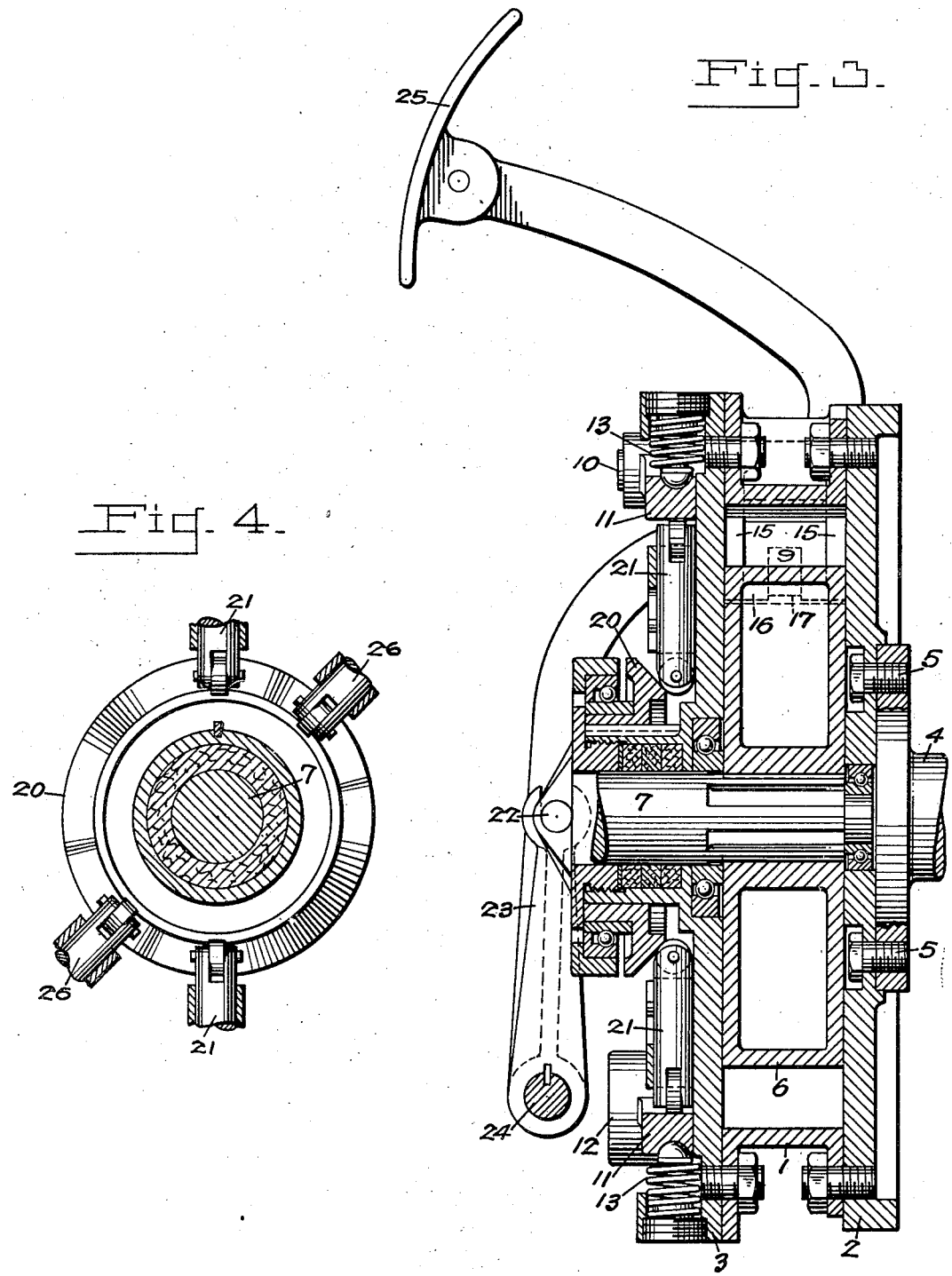
INVENTOR
Charles H. Kasch
BY
ATTORNEYS Jan. 26, 1943. C. H. KASCH 2,309,119
AUTOMATIC HYDRAULIC CLUTCH
Filed Feb. 12, 1941  3 Sheets-Sheet 3

INVENTOR
Charles H. Kasch
BY
ATTORNEYS

Patented Jan. 26, 1943

2,309,119

UNITED STATES PATENT OFFICE 2,309,119

AUTOMATIC HYDRAULIC CLUTCH

Charles H. Kasch, Davenport, Iowa

Application February 12, 1941, Serial No. 378,577

20 Claims. (Cl. 192—58)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a clutch for power drive coupling and relates in particular to an automatic hydraulic clutch wherein the thrust is communicated from the prime mover to the driven unit or vice versa through the medium of a fluid.

Briefly the clutch of the invention, in its preferred form, consists of an outer circular drum and an inner elliptical drum tangent at the extremities of its major axis to the outer drum and defining with the outer drum at points intermediate the points of tangency, two chambers for the reception of a fluid. A centrifugally operated pivoted gate in the outer drum drops into contact with the inner drum and, when in contact at the minor axis, effectively locks the fluid which is in advance thereof and thereby urges the elliptical inner drum into rotation.

The clutch comes into action automatically at speeds of the prime mover above an idling speed determined by the centrifugal member, or the clutch may be brought into engagement deliberately by means of a pedal, to give a connection below idling speed or to brake the driven unit when outrunning the prime mover. A one-way valve permits free-wheeling action.

It is, therefore, an object of this invention to produce a clutch with a fluid connecting medium.

It is a further object of the invention to produce a clutch with a fluid connecting medium operable at or above a determinable idling speed of the prime mover.

It is a further object of the invention to produce a clutch with a fluid connecting medium automatically operable at or above a determinable idling speed of the prime mover and free wheeling at any speed.

It is a further object of this invention to produce a clutch with a fluid connecting medium operable either deliberately or automatically at or above a determinable idling speed of the prime mover and free wheeling at any speed.

To these and other ends, the invention consists in the construction, arrangement and combination of elements described hereinafter and pointed out in the claims forming a part of this specification.

A practical embodiment of the invention is illustrated in the accompanying drawings wherein:

Figure 3 is a section taken on the line 3—3 of Figure 1.

Figure 4 is a detail of the conical cam and followers.

Figure 2:
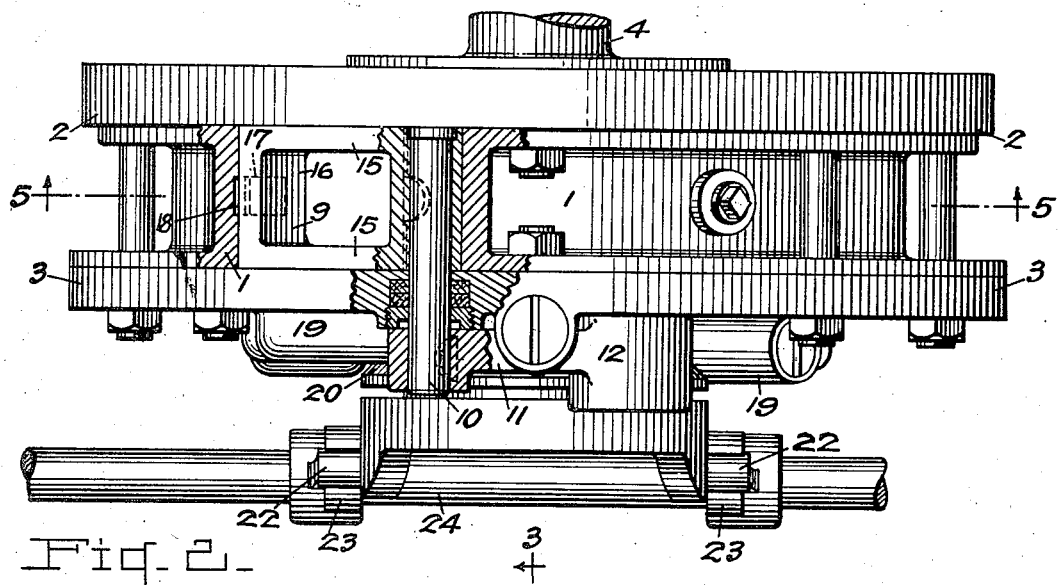
Figure 2 is a top plan view of the clutch with parts broken away.
Figure 1:
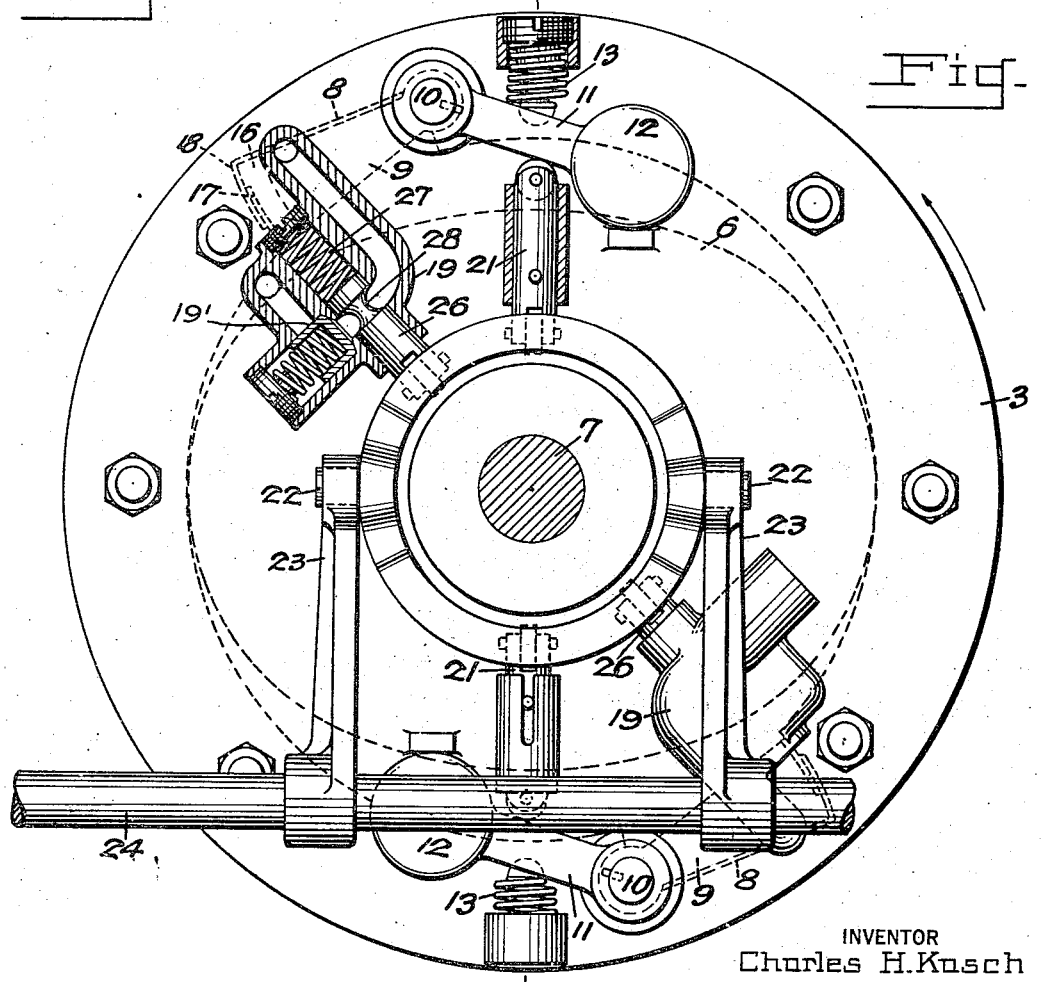
Figure 1 is a view in front elevation of the clutch with some details in section.

Referring to the drawings by characters of reference, there is shown an outer drum composed of a flanged ring 1, and face plates 2 and 3, defining a right cylindrical hollow interior. This drum is rotatively connected to a flange shaft 4 of a prime mover by means of screws 5. The drum and prime mover rotate in the direction indicated by the arrow in Figure 1.

Contained within the hollow of the outer drum and coaxial therewith is an inner elliptical drum 6 keyed to a shaft 7 of the driven unit. This elliptical drum 6 is tangent at the extremities of its longest diameter to the inner surface of ring 1. The spaces between drum 6 and ring 1 are designed to receive a fluid for hydraulic action.

The inner surface of ring 1 contains recesses 8 for the accommodation of swing valves 9 keyed to and pivoting with shafts 10 which are bushed into the face plate 3. Also keyed to the shafts 10 but exteriorly of the outer drum are levers 11 bearing centrifugal weights 12. Springs 13 bearing against levers 11 ordinarily maintain swing valves 9 in their recesses 8 at rotational speeds below a certain value depending upon the mass of the centrifugal weights 12 and the length of their lever arms 11. The fluid is introduced through ports 14.

Swing valve 9 is in the form of a hollow square in longitudinal section and has arms 15 in the form of circular sectors. The curved solid base 16 of the valve 9 has a channel 17 running part way thereacross. A similar channel 18 lies in the corresponding portion of the recess 8 and terminates short of the main chamber of the outer drum. These grooves, together with the opening between the arms of the swing valve, constitute a passage for the fluid which is swept out by the swing valve when the latter is in contact with the inner drum. However, when the swing valve is in contact with the inner drum at or near the terminus of its minor axis, the ungrooved portions of the valve and the recess are in register, the fluid escape is cut off, and the body of fluid in advance of the swing valve urges the inner elliptical drum into rotation with the prime mover.

Figure 5:
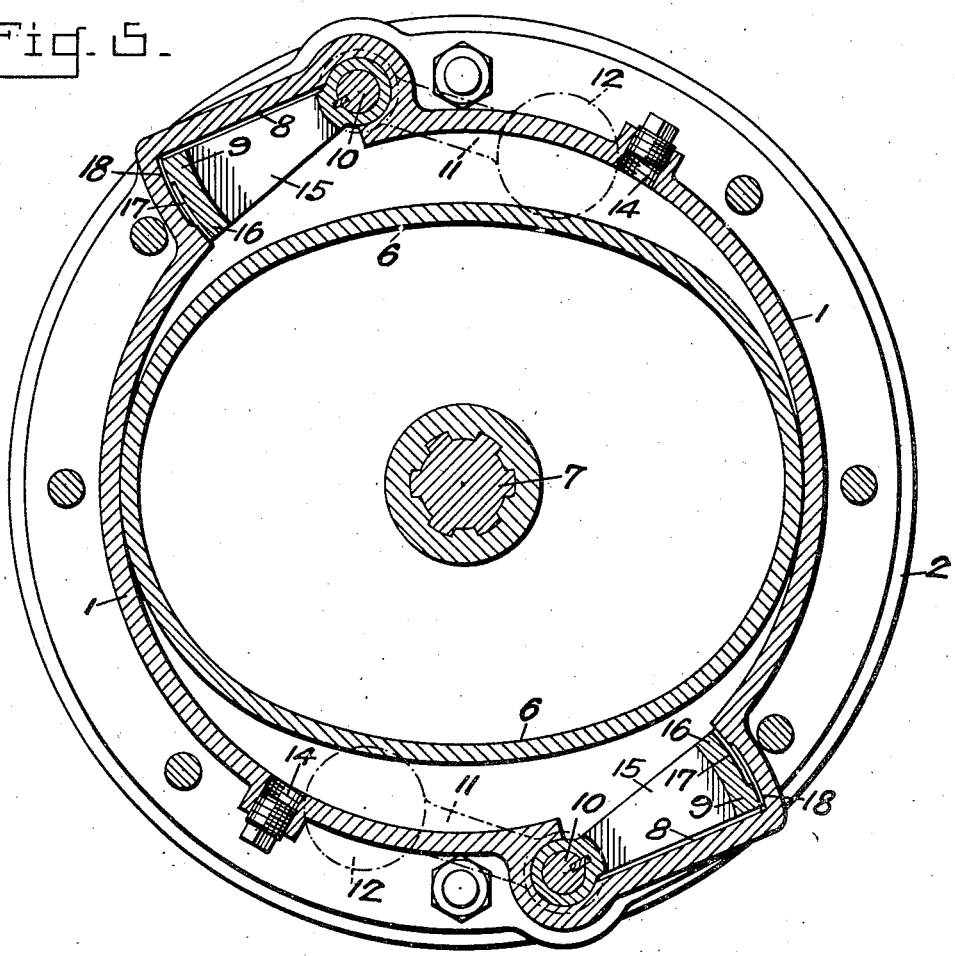
Figure 5 is a section taken on the line 5—5 of Figure 2.
Figure 6:
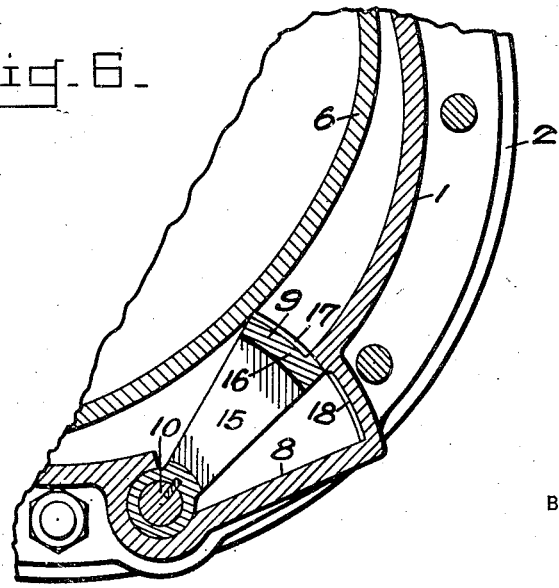
Figure 6 is a detail of Figure 5, showing the swing valve in fluid-locking position.

As the speed of the drum increases, the centrifugal force on weights 12 gradually increases, slowly overcoming springs 13. At first, however, the centrifugal force will not be great enough to move valves 9 to the position shown in Fig. 6, but to some position intermediate the position of Fig. 5 and the position of Fig. 6; in this intermediate position, channels 17 and 18 will register, permitting fluid to escape through the passage formed thereby. The drum will therefore continue to rotate without driving member 6 with it. As the drum and elliptical member 6 rotate relatively to each other, the long axis of the elliptical member will engage valves 9, pushing them back to their recessed position shown in Fig. 5. Thus, valves 9 will continue to oscillate at low speeds, until the speed of the drum is great enough to force weights 12 outward, and to swing the valves 9 inward all the way to the position of Fig. 6, in which position fluid escape is completely cut off.

When the prime mover is rotating at or below idling speed the clutch rotor 6 can rotate freely, independently of the prime mover, as when a vehicle is rolling down hill. However, if the swing valve 9 is in blocking position, any tendency of the driven unit to exceed the prime mover would meet fluid resistance behind the valve. To make the clutch free-wheeling a by-pass means 19 having a one-way valve 19' is provided. This permits passage of the fluid around the swing valve 9 in the direction of rotation of the prime mover.

In order to engage the clutch at will, either below idling speed or while free wheeling, means are provided for operating the swing valve which comprise a cone-shaped cam 20 surrounding the shaft 7 of the driven unit and followers 21 bearing on the centrifugal levers 11. The cone cam, through pins 22 is engaged in the forked ends of levers 23 which are keyed to a shaft 24 to which rotation is imparted by means of a pedal 25. A thrust on the pedal 25 thus results in bringing swing valves 9 into contact with the inner drum for ultimate hydraulic connection between the parts of the clutch in the same manner as when swung by the centrifugal member 12.

If the clutch is to be used for braking the rotor 6 by means of the prime mover, the closing of swing valves 9 in itself will not be effective because of the action of valve 19' by-passing the swing valve. For this reason, further followers 26 are provided. These are fitted as pistons in by-passes 19 and are urged into contact with cone cam 20 by means of springs 27 within the one-way valve housing. A necked portion 28 keeps the passage open in by-pass 19 when followers 26 are not engaged. However, when follower 26 is moved by cone 20 the follower will move across and close the valve passage and terminate the by-passing action. Thus, the pressure behind the swing valve 9 when the latter is in contact with the minor axis of the elliptical drum will serve to transmit the momentum of the ordinarily driven unit back to the prime mover and thus brake the former.

I claim:

1. A clutch comprising an outer fluid-tight rotating unit and an inner fluid-tight coaxially but independently rotating unit, said units being spaced to form a fluid chamber therebetween but making sweeping contact in fluid-sealing relation on at least one section of said chamber, and lock means on one of said units movable across said chamber and into engagement with the other of said units in fluid-trapping relation, whereby the trapped fluid forward thereof serves as a connecting link between said units, fluid passing means in said lock means, said fluid-passing means being closed in the innermost position of said lock means.

2. In a clutch as in claim 1, centrifugal means to operate said lock means.

3. In a clutch as in claim 1, centrifugal means to operate said lock means and means for operating said lock means at will independently of said centrifugal means.

4. In a clutch as in claim 1, one-way valve means to by-pass fluid around said lock means in the direction of rotation of said inner drum.

5. In a clutch as in claim 1, centrifugal means to operate said lock means, valved means to by-pass fluid around said lock means, and means to cut out said valved means and operate said lock means independently of said centrifugal means.

6. A clutch comprising an outer fluid-tight rotating circular drum and an inner fluid-tight coaxially but independently rotating drum of elliptical section snugly fitted between the faces of the outer drum and contacting the circular inner surface of the outer drum at the extremities of its major axis to constitute a fluid chamber between said drums with maximum section along the line of the minor axis of the inner drum, at least one recess in said outer drum and lock means pivotally mounted in said recess and swingable into and out of the path of said inner drum, said lock means having a solid portion sized to close the said chamber at its greatest cross-section when the said solid portion is in contact with the inner drum at the line of its minor axis, by-pass means for said lock means controlled by the position of said lock means.

7. A clutch as in claim 6, wherein said by-pass means comprise aligned fluid-passing means in said recess and said lock means, said fluid passing means being so limited as to be out of register when said solid portion is in contact with said inner drum in the vicinity of its minor axis.

8. In a clutch as in claim 6, centrifugal means to operate said lock means.

9. In a clutch as in claim 6, centrifugal means to operate said lock means and means comprising a cone-shaped cam and followers for operating said lock means independently of said centrifugal means.

10. In a clutch as in claim 6, one-way valve means to by-pass fluid around said lock means in one direction of motion of said inner drum.

11. In a clutch as in claim 6, centrigugal means to operate said lock means, one-way valve means to by-pass fluid around said lock means in one direction of rotation of said inner drum, and means to simultaneously cut out the valve means and operate the lock means independently of centrifugal force.

12. A clutch comprising an outer circular drum and an inner elliptical drum coaxially mounted with respect to said outer drum, said inner drum being of a thickness to fit snugly between the faces of said outer drum and contacting the latter at the extremities of its major axis, at least one recess in the inner periphery of said outer drum and a fluid gate pivotally mounted in said recess and swingable into and out of the path of said inner drum, a solid extremity on said gate and fitting in the recess, said extremity being sufficient to close the space between the drums at its greatest section when swung into contact with the inner drum, groove means in said extremity and in said recess registering so as to by-pass fluid, but limited in extent so as to be out of register when the extremity of the lock means is in contact with the inner drum in the region of its minor axis, centrifugal means on said lock means to operate the same at a given speed of the outer drum, a one-way valve on said outer drum to by-pass fluid around said lock means in one direction of rotation of said outer drum, and means for simultaneously neutralizing said one-way valve and actuating said lock means independently of said centrifugal means.

13. A power transmission device comprising an outer rotatable member of circular inner periphery and an inner, independently rotatable member of non-circular outer periphery, said members defining between their peripheries a fluid chamber with continuity broken by tangent contact of said peripheries, fluid-flow obstructing means carried by said outer member and movable into said chamber, and means for by-passing fluid around said obstructing means, said by-passing means so constructed and arranged as to be rendered ineffective when said obstructing means is in contact with the inner member on a line other than the said line of tangent contact.

14. A device as in claim 13 wherein the position of said obstructing means when said by-pass is ineffective is substantially across the maximum cross-section of said chamber.

15. A power transmission device comprising tangent outer and inner members rotatable relative to each other and defining between them a fluid chamber closed at the line of tangency, obstruction means carried by one of said members and movable into the chamber to obstruct fluid passage through the same, and by-pass means for said obstruction means controlled by the position of said obstruction means in the chamber.

16. A device as in claim 15 wherein said by-pass means is closed when said obstruction means is athwart said chamber in the region of its greatest cross-section.

17. In a device as in claim 15, centrifugal means for operating said obstruction means.

18. In a device as in claim 15, centrifugal means for operating said obstruction means and independent, manual means for operating said obstruction means.

19. In a device as in claim 15, a second by-pass means having a one-way valve to permit fluid flow around said obstruction means in a direction opposite to the flow through the first mentioned by-pass means.

20. In a device as in claim 15, centrifugal means for operating said obstruction means, independent manual means for operating said obstruction means, and a second by-pass means having a one-way valve for permitting fluid flow around said obstruction means in a direction opposite to the flow through the first mentioned by-pass means, said second by-pass means having a closure means operated by said manual means.

CHARLES H. KASCH.